Jan. 13, 1970 J. M. McKEAN 3,489,226
SLUSHING SCRAPER CABLE CONNECTION
Filed Aug. 1, 1966 2 Sheets-Sheet 1
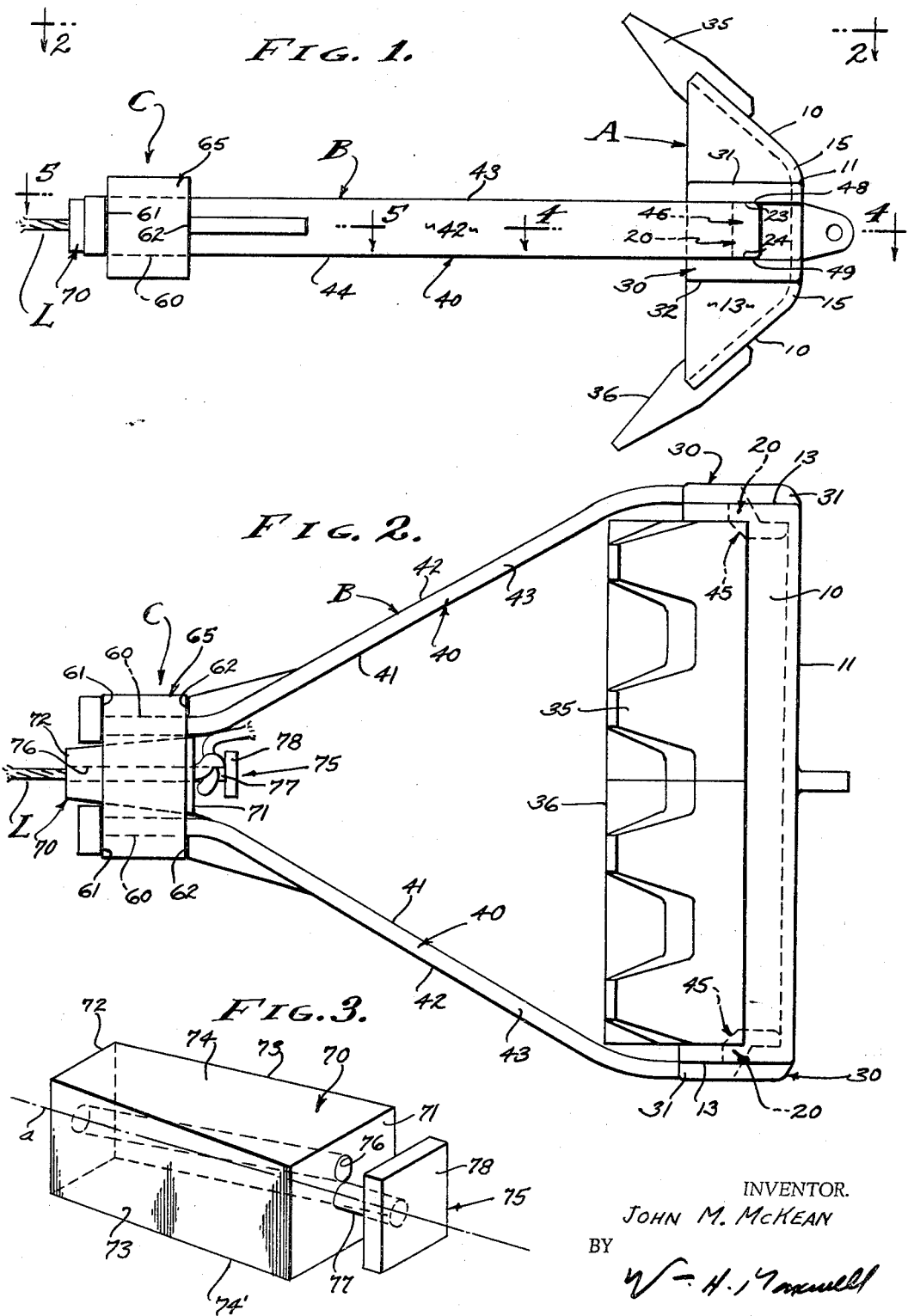
INVENTOR.
JOHN M. McKEAN
BY
AGENT Jan. 13, 1970  J. M. McKEAN  3,489,226
SLUSHING SCRAPER CABLE CONNECTION
Filed Aug. 1, 1966  2 Sheets-Sheet 2
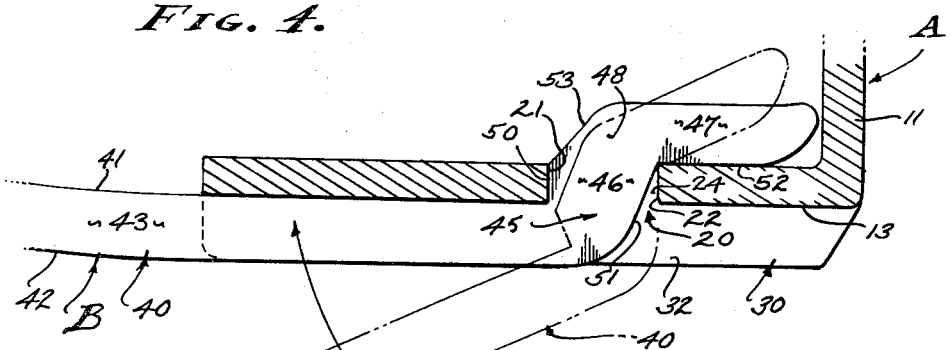
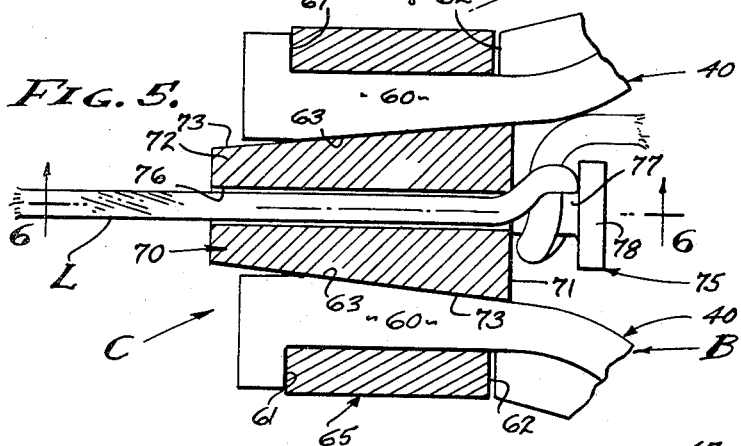
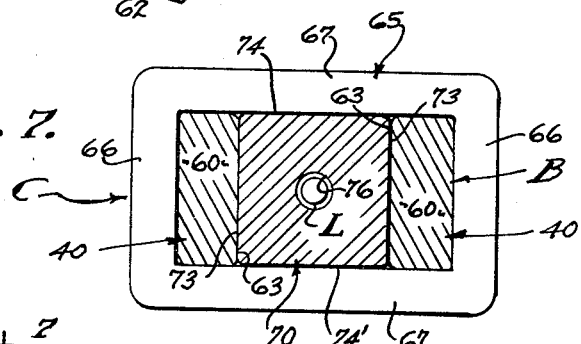
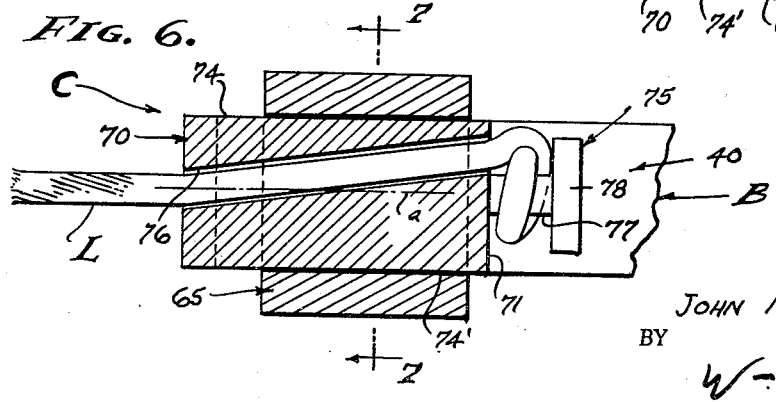
INVENTOR.
JOHN M. McKEAN
BY
AGENT

United States Patent Office 3,489,226
Patented Jan. 13, 1970

3,489,226
SLUSHING SCRAPER CABLE CONNECTION
John M. McKean, San Clemente, Calif., assignor to Vulcan-Denver Corporation, Englewood, Colo., a corporation of Colorado
Filed Aug. 1, 1966, Ser. No. 569,184
Int. Cl. E02f 3/60; B21d 39/00; A01b 35/20
U.S. Cl. 172—26.5                                3 Claims

ABSTRACT OF THE DISCLOSURE

An improved slushing scraper cable connection.

---

This invention relates to dragline equipment for mining and is particularly concerned with dragline scrapers such as those used in cut-and-fill operations, to haul diggings through tunnels and to transport the same, it being a general object of this invention to provide a dragline connection that secures the scraper together and in condition for operation. With the cable connection hereinafter disclosed the scraper is held assembled while the dragline cable is attached directly thereto without resort to the usual terminal cable fittings, it being feasible with the present invention to attach the raw end of a cable to the cable connection provided therefor.

The maintenance of dragline scrapers is an ever increasing problem in conducting of mining operations; not only from a pure mechanical point of view having to do with assembly and reassembly, but also from the access or accommodation point of view. Especially under subterranean conditions, space and good working conditions are most often difficult to find, and constructions which are bolted together have been the cause of time losses and considerable expense applied toward repairs, and in many cases complete removal of the scraper from service because of damage to the bolted connections which has caused disassembly and replacement of parts to be made difficult if not impossible at subterranean environments. Also, a decided disadvantage of bolted or pivot pin connections in equipment of the type under consideration is that wear takes place and looseness develops, whereupon the effective digging angle of the bucket or scraper is adversely affected. Since the digging angle of the scraper is an important factor that must be maintained and not permitted to deviate, a slushing scraper that is boltless in every respect is to be desired, and a scraper that is attachable to a dragline without the aid of the usual cable end fittings is also to be desired.

Specifically, the present invention is concerned with a "Boltless Slushing Scraper" of the type disclosed in my copending application Ser. No. 494,482, filed Oct. 11, 1965, and which is improved by the provision herein of a unique dragline connected to the harness, whereby the boltless scraper is maintained together as a working unit and whereby any raw cable end, without special fittings, can be reliably connected to the harness.

It is an object of this invention to provide a slushing scraper cable connection which is inherently self-tightening, firstly self-tightening as related to the harness of the scraper, and secondly self-tightening as related to the connection of the cable thereto. With the cable connection hereinafter disclosed the one assembly of parts is operable to maintain the unity of the assembly while maintaining the connection to the cable end of the dragline.

It is still another object of this invention to provide a slushing scraper cable connection of the character thus far referred to and wherein the fewest number of the most simple parts are involved, and wherein said parts are so related that it is a simple matter to connect or disconnect a cable, and wherein a worn or chaffed cable end can be quickly discarded and the cable reattached to the harness at the said cable connection.

The various objects and features of this invention will be fully understood from the following detailed description of the typical preferred forms and applications thereof, throughout which description reference is made to the accompanying drawings, in which:

FIG. 1 is a side elevation of a slushing scraper embodying the invention, a reversible scraper which can be used in the position shown, or in an alternate position when it is turned over. FIG. 2 is a plan view taken as indicated by line 2—2 on FIG. 1. FIG. 3 is an enlarged perspective view of the principal element involved in the cable connection. FIG. 4 is an enlarged detailed sectional view illustrating the boltless construction between the harness and the scraper body, the phantom lines showing the mode of assembly.

FIGS. 5, 6 and 7 are orthographic views of the assembled cable connection, FIG. 5 being taken as indicated by 5—5 on FIG. 1, FIG. 6 being taken as indicated by line 6—6 on FIG. 5, and FIG. 7 being taken as indicated by line 7—7 on FIG. 6.

The slushing scraper of the present invention is a "boltless scraper" that involves generally, a bucket body A, a harness B, and a cable connection C. The first two elements of the combination A and B are fully disclosed and claimed in my copending application Ser. No. 494,482 while the third element C is unique with this application. However, as it is with the cross-referred application, it is these three general elements which are advantageously combined without the use of bolts, and with the improvements now disclosed the elements are combined into a unit virtually without a fastener of any kind whatsoever. And, when reference is made to "boltless" or to fasteners generally, I mean that the instant scraper is assembled without the use of any kind of fastener, and this exclusion includes all cable fittings and/or clamps or any like accessory part. That is, this slushing scraper is truly fastener free in its assembly and connection to a drag line cable.

The body is the main principal element of the scraper and it is the part which determines the general size, shape and capacity of the scraper. The body has a back 11 that joins the rear edge portion of the bottom and projects upwardly therefrom, the particular scraper shown being a reversible scraper wherein there are opposite bottoms 10 and each projecting from the back 11 at a corner 15. The bottoms 10 may be a substantially flat plate-like element or part that is angularly disposed, as is shown in the drawings when the scraper is in a normal operating position. The back 11 of the body is integrally joined to the rear edge of the bottom 10 at a corner 15 and replaceable blades 35 and 36 are provided for ground engagement. The blades 35 are tooth-like, while the blade 36 is a scraper or straight blade, and either blade can be employed as circumstances require. As shown, the sides 13 of the body A may be flat vertically disposed plate-like parts joined to and extending forwardly from the bottom 10, back 11 and rider bar 12.

The sides 13 are formed so as to hingedly receive and keep the harness B which comprises generally a pair of like or identical bails to be later described. Said bails are separately applicable to the body A and to this end the opposite sides 13 are each provided with an opening 20 to receive the rear end portion of a bail and with guide means 30 to direct the forward extensibility of the bail. In practice, each opposite side is like or identical and comprises a vertically disposed wall of substantial thickness the opening 20 being located intermediate the corners 15 and at or near to the back 11. The opening 20 is of a vertical extent to just freely pass the vertical extend of the bail and it is of a longitudinal extent to just freely pass the thickness, or transverse extend of the rear end portion of the bail. The bail is normally of rectangular cross-section in which case the opening 20 is also rectangular, having spaced and parallel opposed shoulders 21 and 22 and having spaced and parallel opposed top and bottom seats 23 and 24. For all practical purposes as later described, the shoulders 21 and 22 and seats 23 and 24 are flat and in planes normal to the faces of sides 13, and positioned for permitting rearward swinging movement of the bail as is required in order to effect assembly of the body A and harness B.

The guide means 30 that is provided to direct the forward extensibility of the bail can vary in form and is shown as comprised of two separately operable structures. Primarily, since it is highly desirable to protect parts by avoiding protrusions, etc., the bail is recessed into the side 13 and is guided between spaced parallel and opposed rails 31 and 32. In practice, the rails 31 and 32 are continuations of the top and bottom seats 23 and 24 respectively, being disposed in the same planes as said respective seats. Thus, the vertical extent of the bail is just freely received between and so as to be guided by said rails. It is a feature that the rails 31 and 32 are at the exterior of the side 13 and extend forwardly from the opening 20, and thereby placing the shoulder 21 immediately adjacent to the exterior face of the side 13 while the rails in effect establish a recess adapted to receive the rear end portion of the bail.

The harness B is secondary to the main body element A and involves two like and preferably identical bails 40 that are received in the openings 20 at opposite sides 13 of the guide means 30. As is clearly shown, the harness B extends forwardly from the bucket body A and from the sides 13, in a plane intermediate the corners 15. The exact angular relationship of the harness B to the bucket body A is an important factor and particularly the angular relationship of the harness to the cutting edge of blade 35 or 36. The said cutting edge is comprised of replaceable cutters as is indicated and which are rigidly affixed to the bucket body at exactly predetermined angles, it being understood that the cutter angle is critical. The bails 40 are received in the openings 20 and they are embraced by the guide means 30 through hinged engagement with the sides 13, so that when the said bails 40 are brought together with the cable connection C a solid interlocking of the elements A and B is effected.

The bails 40 can be identical, and this is preferred, each bail being an elongate arm-like structure. As is shown, the bail is of uniform rectangular cross-section, having inner and outer side faces 41 and 42, and top and bottom edges 43 and 44, said faces and edges being normally related and extended parallel with respect to each other. Each bail 40 is adapted to lie flat against the side 13 and extends straight forward, and is bent and/or turned so as to extend to a drag point at the center of and forwardly of the bucket body. To these ends the said face 41 is directly engaged with the side 13, while the top and bottom edges 43 and 44 are directly engaged with the rails 31 and 32, it being a simple matter to manufacture these features so as to have a substantially close fit. Therefore, when the elements are arranged in working position the rails of the guide means 30 fix the angular relationship as required.

The harness bails 40 are hingedly related to the bucket body A and are attached to the body by providing releasable hinges 45. The hinge 45 involves a post 46 and tongue 47 formed integral with and as the rear portion of the bail. In practice, the post 46 and tongue 47 are continuations of each other and of the bail itself, having top and bottom edges 48 and 49 in the planes of the edges 43 and 44, respectively. The post 46 is shaped to have bearing engagement in the opening 20 while being free to articulate therein so as to permit swinging movement of the bail 40, and to these ends the post has a bearing 50 disposed to engage on the shoulder 21 and it has a reclined back wall 51 disposed to clear the shoulder 22. The bearing 50 is right angularly related to the inside face 41 of the bail and is formed to be coextensive with the area of the shoulder 21, while the back wall 51 is chamfered and extends from the inside edge of said side 13 at shoulder 22 to the outside face 42 of the bail. In practice, the wall 51 is reclined forwardly at 24°.

The tongue 47 is shaped to have interlocked engagement with the side 13 when the bail 40 is in working position and is characteristically offset to engage with the inner face of the side 13. To this end, the tongue 47 projects rearwardly from the inner end of the post 46 and has a flat face 52 that is spaced from and parallel to the inner side 41 of the bail, and positioned to engage the inner face of side 13 when the bail is arranged in working position. In order to permit swinging movement of the bail, and because the attachment of the tongue to the post requires body or thickness, the tongue 47 is characterized by an inclined front wall 53 that adjoins the bearing 50 and extends therefrom to the inner side of the tongue. In practice, the wall 53 is inclined at 36°. It is the reclination of wall 51 and the inclination of wall 53 which together produces a diagonal post 46 configuration extended between the bail and its rearwardly projecting and inwardly offset locking tongue. Further, the above described diagonal post 46 configuration and radiused shoulder 22 permits the articulation required of the hinge 45, during insertion of the tongue 47 through the opening 20 for reception of the post 46 with its bearing 50 engaged on the shoulder 21 and with the edges 48 and 49 positioned on the seats 23 and 24, respectively. The assembly necessitates swinging movement about the hinge 45 and the back wall 51 has a camming action as it cooperatively engages the shoulder 22 and which assures movement of the post 46 and consequent placement of the bearing 50 in engagement with the shoulder.

Having manipulated the principal elements A and B into an assembly of parts as shown and above described, the foremost end portions of the bails are brought together by the cable connection C, thereby conditioning the assembly for use. To this end the dragline cable connection C is provided and which stresses the bails 40 in bringing them together at the apex of the slushing scraper assembly. In accordance with the invention it is this cable connection C that holds the slushing scraper in its assembled working condition, with the foremost extended portions 60 of the bails 40 drawn inwardly together and with the dragline cable embraceably coupled to the assembly between the portions 60. Accordingly, the invention involves a lock collar 65 and a wedge block 70 which has a cable coupler 75 incorporated therein. The lock collar 65 embraces the forwardly extended portions 60 of the two bails, while the wedge block 70 occupies a breech or otherwise open space intermediate the portions 60 to force said portions into engaged embracement with the surrounding collar.

During assembly of the harness B to the bucket body A, the bails 40 can be moved, or sprung if necessary, together for the reception of the lock collar 65 thereover. Therefore, the securement means that retains the lock collar 65 in working position on the harness involves opposed shoulders 61 and 62 disposed normal to and projecting outwardly from the outer side face 42 of the two bails 40, respectively. The said bail portions 60 extend parallel in spaced relationship to each other, when the parts are in finally assembled position, and the shoulders 61 and 62 are of substantial height and so spaced as to oppose opposite front and back ends of the collar to be described. Further, the inside face 41 of the said parallel portions 60 are modified so as to be rearwardly divergent at 63 in their establishment of the above referred to breech therebetween. It is this divergent and/or tapered breech opening which receives the wedge block 70.

The lock collar 65 is provided for the hoop-stressed encompassing embracement of the two forwardly extending bail and end portions 60. In practice the composite cross-section of the two bails with a normal breech therebetween is that of a rectangle, and consequently the lock collar 65 is of rectangular cross-sectional configuration. As shown, the lock collar 65 is an open ended box section disposed on a fore and aft central axis $a$, and it has flat vertically disposed cheek plates 66 to engage flatly against the outer side face 42 intermediate the shoulders 61 and 62, and it has flat horizontally disposed header plates 67 to engage flatly with the top and bottom edges 43 and 44. The lock collar 65, which is essentially square, is placed over the bail end portions 60 as shown, whereupon the wedge block 70 is put into place, loosely, to occupy the breech between the inclined face at 63.

The wedge block 70 is simply put into place as above described and is an elongated part disposed along the central axis $a$, with a large rear end 71 and a smaller front end 72. The wedge block 70 is essentially a trapezoidal solid, having flat vertically disposed and rearwardly divergent cam faces 73 to engage flatly with the opposite cheek plates 66, and having flat horizontally disposed and parallel top and bottom faces 74 and 74' to slideably enter between the header plates 67. It will be apparent that the wedge block 70 as it is shown and described will enter into position in the breech opening between the bails 40, to forceably separate the end portions 60 and to press them into tight engagement with the cheeks 67 of the lock wedge block 70 is moved as by pulling it forwardly with the cable coupled thereto as will now be described.

The tapered coupler C is provided in accordance with the invention, to cause the assembly to remain intact directly as a result of the connection thereto of the dragline L and without the aid of intervening means. The cable coupler C is formed as part of and integral with the wedge block 70 and the formation thereof is disposed along the axis $a$ and involves an eye 76 and a post 77. The eye 76 is disposed on the axis $a$ to pass the aft end of the dragline L so that the dragline extends from and is accessible at the rear of the wedge block 70, while the post 77 is disposed laterally of the axis $a$ and extends away from the place of rearward emanation of the dragline L. In carrying out the invention, the eye 76 is established by providing a bore through the wedge block 70 and which is coextensive with the block to open at the rear and front ends 71 and 72.

The bore of eye 76 is generous so as to freely pass the drag line end portion which is slideably engaged through the wedge block with a generous free end projecting loosely (at first) from said block. The post 77 is located at one side of the eye 76, just clear of said bore and parallel therewith, and is preferably a round post of slightly larger diameter than that of the cable with which it is to be engaged, and of rearward longitudinal extent about twice that of the cable diameter. As is shown, the post terminates in a head 78 of sufficient heft to receive hammer blows for the purpose of driving the wedge block 70 forwardly in order to initially engage the same, and to protectively cover the knot of the cable end that is trained around the post 77. Finally, the dragline end portion is looped away from the post 77 as said line emanates from the eye 76, and the loose end of the line is trained on turn around the post 77, right- or left-handed as may be desired, and is passed beneath the said loop, between the first mentioned loop and the said post. The free loose end of the dragline cable is then pulled tight so as to snug the half-hitch knot above described.

From the foregoing description it will be seen that this slushing scraper is assembled of parts entirely without resort to fasteners which are ordinarily employed. The boltless construction hereinabove described relates to the entire scraper assembly, including the harness connection to the dragline cable. As is described in detail in the foregoing specification, the wedge block 70 operates conjointly with the lock collar 65 to tightly position and couple the otherwise free swinging ends of the harness bails 40. When the dragline cable is pulled taut the half-hitch knot at the post 77 is tightened and the wedge block 70 is simultaneously pulled forward into a final working position. The angle of the wedged engagement is such that the frictional engagement between the bails is self-locking, all to the end that the slushing scraper assembly remains together as a unit of construction until deliberately disassembled by pressing or striking the front end 72 of the wedge block and driving it rearwardly.

Having described only a typical preferred form and application of my invention, I do not wish to be limited or restricted to the specific details herein set forth, but wish to reserve to myself any modifications or variations that may appear to those skilled in the art.

Having described my invention, I claim:

1. In a slushing scraper adapted to be pulled by a dragline cable secured at the forward end thereof and having an elongated bucket body with elongated bails extending convergingly forwardly from opposite end portions of said bucket body with an elongated wedge block being disposed between the foremost end of said bails and with an encompassing collar embraceably surrounding said foremost ends, the improvement comprising: a longitudinally extending dragline cable receiving through passageway within said wedge block at least adjacent the longitudinal axis of symmetry thereof, a cable coupler carried by said wedge block and having a portion thereof which extends rearwardly from the rearward surface of said wedge block, and a dragline cable extending through said passageway and outwardly of said rearward surface and having the free end thereof knotted to said portion of said coupler.

2. An improvement as specified in claim 1 wherein said cable coupler extends rearwardly of said wedge block along an axis thereof which is substantially parallel to said longitudinal axis of symmetry.

3. An improvement as specified in claim 1 wherein said passageway extends along an oblique axis with respect to said axis of symmetry.

References Cited

UNITED STATES PATENTS

| | | | |
|---|---|---|---|
| 2,482,320 | 9/1949 | Clemmer | 172—26.5 |
| 2,763,074 | 9/1956 | Whisler | 172—26.6 |
| 3,164,914 | 1/1965 | Wilson | 172—26.5 |
| 3,340,628 | 9/1967 | Dobbie et al. | 172—26.5 |

ROBERT E. PULFREY, Primary Examiner

W. J. CONLON, Assistant Examiner

U.S. Cl. X.R.

24—123, 128; 29—517; 172—772